Jan. 6, 1925.
H. W. HAYES
FISHING LURE
Filed April 7, 1924
1,522,451
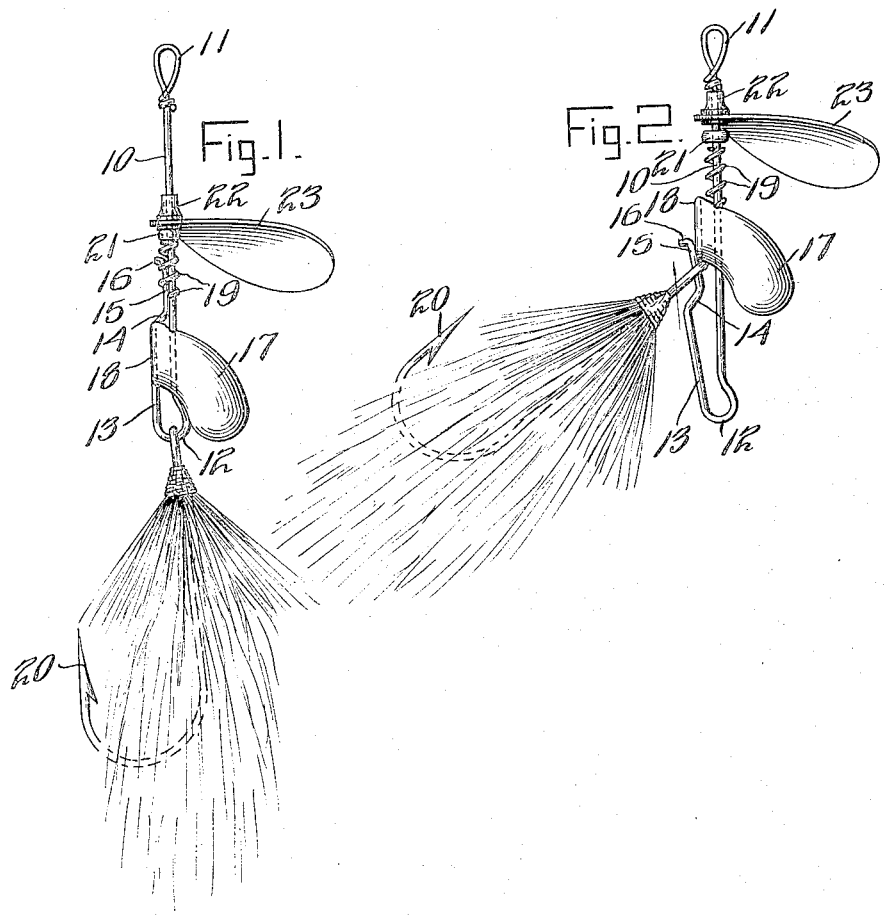
Inventor
Harry W. Hayes
By
Attorney Patented Jan. 6, 1925.

1,522,451

UNITED STATES PATENT OFFICE.

HARRY W. HAYES, OF INDIANAPOLIS, INDIANA, ASSIGNOR TO JOHN J. HILDEBRANDT COMPANY, OF LOGANSPORT, INDIANA.

FISHING LURE.

Application filed April 7, 1924. Serial No. 704,853.

*To all whom it may concern:*

Be it known that I, HARRY W. HAYES, a citizen of the United States, residing at Indianapolis, in the county of Marion and State of Indiana, have invented certain new and useful Improvements in Fishing Lures, of which the following is a specification.

My said invention relates to an improved fishing lure comprising a combined casting sinker, spinner blade and shaft for sustaining an artificial fly. It is an object of the invention to provide a device in which the chance for a fish to escape after it has taken the hook is minimized by doing away to a high degree with the possibility of the hook becoming disengaged from the shaft.

Another object of the invention is to provide an improved casting sinker cooperating with the shaft to keep the hook in place, to assist in the removal of the hook and to prevent the barb of the hook from engaging the shaft due to which cause the hook in other constructions frequently becomes locked in an inoperative position.

Another object is to provide an improved spinner blade which shall be better polished than the ordinary device of this character and which also shall give more life and action to the fly.

Still another object is to provide an arrangement of parts tending to keep the hook down in normal position.

Referring to the accompanying drawings which are made a part hereof and on which similar reference characters indicate similar parts,—

Figure 1 is an elevation of my device with the parts in position thereon, and

Figure 2 a similar view showing the parts in the positions assumed when the hook is to be removed.

In the drawings reference character 10 indicates a wire shaft bent at one end to form a loop 11 for attachment of a line or a length of gut. At its lower end the shaft is bent to form a ring 12 and a return section 13 extending parallel to the body of the shaft. This section is again bent at 14 so as to bring the upper part 15 into engagement with the shaft proper in its normal position. Finally the wire terminates in an outwardly bent part 16. The outward curve of the ring occurs at the rear of the shaft and at the lower end but no part of the ring projects in front of the line defined by the straight section 13.

A sinker 17 is perforated and is arranged to slide on the shaft. The sinker has a depending portion at the rear side of the shaft and terminates at the front side not far from the shaft body. The front face of the sinker at 18 has a groove of sufficient depth to accommodate the parts 13, 14 and 15 of the shaft wire so that the sinker may pass back and forth between the positions shown in Figures 1 and 2 without becoming disengaged from said groove. A spiral wire 19 surrounds the parts 15 and 10 in Figure 1, this wire being so formed that it may be rotated and thus caused to unscrew itself from engagement with the shaft wire extension. When so unscrewed the sinker may be raised as shown in Figure 2, the wire and parts above the same being also pushed upward. The nose of the sinker now has a cam action against part 14 to open the hook-like extension and facilitate release of the hook as in Figure 1. At this time the hook 20 may be removed or replaced after which the sinker is returned to the position of Figure 1 and the wire is rotated back to the position of Figure 1.

It will be noted that the end 16 projects in convenient position to be engaged by the extremity of the spiral wire and cooperates therewith to force the spiral down along the shaft and the part 15 of the shaft wire extension. When the parts are in the position shown in Figure 1, the sinker abuts at its upper corner or nose against the part 14 of the shaft wire and at its under side rests against the upper curve of the ring 12 so that it is locked securely in place and held against any independent movement. It follows that the hook is also locked down and cannot be released as in some other known devices by the action of the fish in forcing the eye of the hook up against the sinker and so moving it up the shank. It should also be noted that the part 16 facilitates application of the hook, as will be clear from Figure 2, when the parts are in the position indicated in said figure.

Another purpose served by the part 16 is to prevent "crawling" of the coil 19 due to upward pressure by the sinker. Such pressure if the coil extends down far enough will compress the coil and cause it to move bodily upward or, failing this, to move somewhat on the rebound unless checked in some way, which function is effectively performed by the part 16.

I have located a bead-shaped brass washer 21 above the spiral coil to separate the coil from a sleeve 22, preferably of brass, on which the spinner blade 23 is supported in any convenient manner as by means of an enlargement at 23 on one side of the blade cooperating with the expanded lower end of the sleeve. The brass washer 21 is preferably of a size to fit more or less closely within the flared extension of the sleeve to minimize the wear between the sleeve and the collar. The uppermost convolution of the coil 19 is preferably wound closely about the shaft adjacent the washer 21 to provide a good bearing surface between the coil and the washer. This close fit between the upper coil of the spiral and the shaft also reduces to a minimum the tendency of the coil to wobble on the shaft.

The extension 13 lies parallel to the shaft except where it merges into the ring 12 and therefore at this side the hook cannot approach close enough to the shaft to contact therewith. At the other side where the bend in the ring extends rearward from the shaft the hook is prevented from approaching the shaft by the conformation of the sinker which is in the way of such movement. This not only keeps the hook from becoming entangled with the line, but also decreases the tendency of the shaft-ring and the eye of the hook to lock each other as frequently occurs at the shoulders of other types of shaft-rings. In my device there is no shoulder at the front side of the shaft-ring and the shoulder at the rear side is covered and protected by the sinker as hereinafter explained.

The shape of the eye 12 and the shaft wire extension comprising parts 13, 14, 15 and 16 is such that almost any hook on the market can be attached to my device save such as have eyes too small for entry of the shaft wire. The one-wing type of spinner blade imparts more action to the hook and the fly than is the case with the two-wing or propeller type, this being due in part at least to the fact that the less symmetrical the parts are with respect to the line of the spinner shaft the more eccentric and therefore the more noticeable the action of the remaining parts.

It has been found that where spinner blades and tubes are assembled as in the usual manner prior to polishing it is impossible to polish the entire surface since the shoulder on the sleeve interferes with the passage of the buffer over the blade. For this reason I prefer to employ blades and tubes polished before the tube is inserted into the blade, the tube being of such character as may be readily attached without interfering with the polish of the blade, and preferably being made of brass so that it can readily be expanded at the lower end both for holding the blade and to form a satisfactory bearing for the brass washer.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. An angling device comprising a spinner shaft, a sleeve on the shaft, a blade on the sleeve, said sleeve having a shoulder at one side of the blade and being expanded at the other side to hold the blade in place, and a brass washer on the shaft beneath the sleeve fitting at its upper end in the expanded portion of the sleeve, substantially as set forth.

2. An angling device comprising a spinner shaft having a forwardly bent portion approaching close to the shaft adjacent its extremity, a spiral wire on the shaft adapted on rotation to engage said extremity and secure the same to the shaft the uppermost convolution of said wire closely surrounding the shaft, a collar loose on the shaft above said coil and a spinner on the shaft above said collar, substantially as set forth.

3. An angling device comprising a spinner shaft having a forwardly bent portion spaced from the shaft at its lower end and approaching close to the shaft at its upper end for holding a hook, a sinker slidable on the shaft said sinker extending rearward and downward therefrom, and means to prevent rotation of the sinker on the shaft, substantially as set forth.

4. An angling device comprising a spinner shaft having a forwardly bent portion spaced from the shaft at its lower end and approaching close to the shaft at its upper end for holding a hook, a sinker slidable on the shaft, the body of the sinker extending rearward and downward therefrom, said sinker having a vertical groove at its front end cooperating with said forward extension to prevent rotation of the sinker about the shaft, substantially as set forth.

5. An artificial casting device comprising a wire shaft having a forward extension parallel thereto, said extension being bent near its upper end to lie against the shaft and having an outwardly bent extremity, a wire coil rotatable about the shaft having a lower end adapted to engage said extremity, a sinker slidable on the shaft having its front end grooved to engage the extension of the shaft whereby when moved upwardly the sinker exerts a cam action on the rearwardly bent portion of said extension, substantially as set forth.

6. An angling device comprising a shaft having a forward extension parallel thereto and bent near its upper end to lie close to the shaft, a sinker slidable on the shaft having a groove at its forward side engaging said extension, means for locking the extension to the shaft, the nose of the sinker engaging the rearwardly bent part thereof to lock the sinker in place adjacent the lower end of the shaft, substantially as set forth.

7. An artificial casting device comprising a shaft having a forward extension parallel thereto and bent near its upper end to lie close to the shaft, a sinker slidable on the shaft having a groove at its forward end engaging said extension, means for locking the extension to the shaft, the nose of the sinker engaging the rearwardly bent part thereof to lock the sinker in place adjacent the lower end of the shaft, and said sinker having a downwardly and rearwardly extending main portion at the lower end of the shaft, substantially as set forth.

In witness whereof, I have hereunto set my hand and seal at Indianapolis, Indiana this 4th day of April, A. D. nineteen hundred and twenty-four.

HARRY W. HAYES. [L. S.]

Witnesses:
M. L. SHULER,
FRANK B. MESEKE.